Jan. 29, 1957 T. WAGNER 2,779,932
TRAFFIC SIGNAL WITH TIME LAPSE INDICATION
Filed April 7, 1955 3 Sheets-Sheet 1

INVENTOR.
TOBIAS WAGNER
BY
ATTORNEY

Jan. 29, 1957 T. WAGNER 2,779,932
TRAFFIC SIGNAL WITH TIME LAPSE INDICATION
Filed April 7, 1955 3 Sheets-Sheet 2
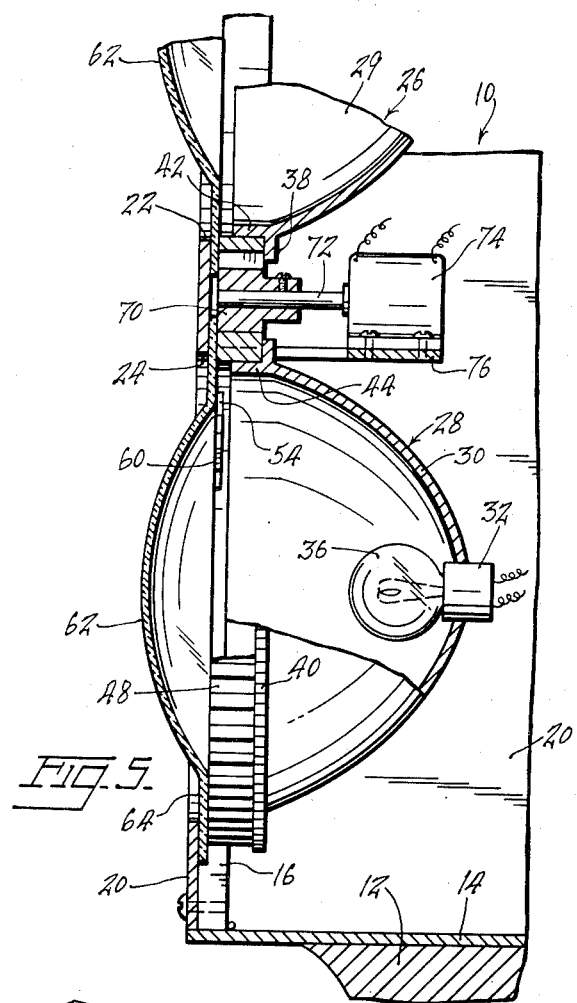
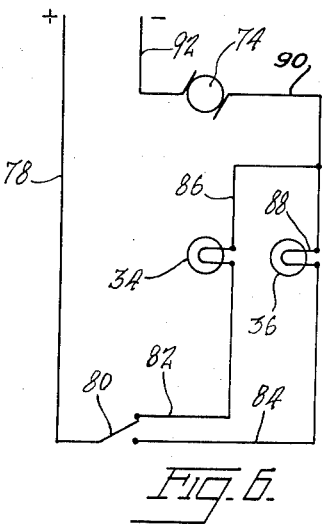
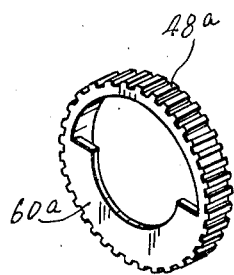
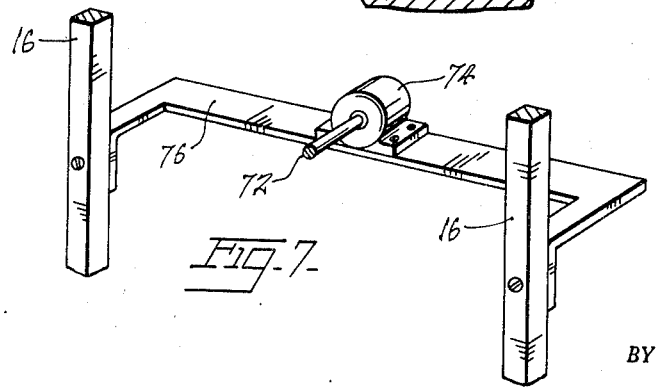
INVENTOR
TOBIAS WAGNER
BY
ATTORNEY Jan. 29, 1957 T. WAGNER 2,779,932
TRAFFIC SIGNAL WITH TIME LAPSE INDICATION
Filed April 7, 1955 3 Sheets-Sheet 3

INVENTOR.
TOBIAS WAGNER
BY
ATTORNEY

United States Patent Office 2,779,932
Patented Jan. 29, 1957

2,779,932
TRAFFIC SIGNAL WITH TIME LAPSE INDICATION

Tobias Wagner, New York, N. Y.

Application April 7, 1955, Serial No. 499,777

3 Claims. (Cl. 340—42)

This invention relates to a traffic light signal which is so designed as to indicate at all times the duration of time remaining before a signal change occurs.

Considerable difficulty is experienced by motorists in bringing their automobiles to a stop when a green light suddenly changes to red. Although in many jurisdictions an amber caution light is included, this does not represent a full solution to the problem, since the amber light remains on, usually, only for a very few seconds. Thus, the motorists may be approaching an intersection, maintaining a normal rate of speed sufficient to permit him to pass the intersection while he still has a green light, and may be suddenly confronted with an imminent light change when he is almost at the intersection. Under these circumstances, it is necessary that he either bring his vehicle to a sharp stop or alternatively, continue on through the intersection despite the fact that the signal may have completely changed before he is fully through the intersection.

It will be seen from the above that it is highly desirable that a motorist be provided with a visual indication, from the time the signal changes until the next change thereof, that will provide him with full knowledge as to the amount of time remaining before the next change. In this way, he can prepare himself further in advance, either for bringing his vehicle to a halt at an intersection, or alternatively, for preparing the vehicle to leave the intersection after it has been stopped thereat by a red light.

The difficulty experienced by motorists is experienced also by pedestrians, who oftentimes, in endeavoring to cross an intersection at which controls exist in the form of traffic lights, find themselves stranded in the middle of the intersection, thereby incurring considerable risk of injury as traffic begins to flow in a different direction.

While it has been heretofore proposed to provide a visual indication on a traffic light signal whereby one can determine, generally, the extent of time remaining before the next light change, the main object of the present invention is to provide an improved type of device, which will be particularly adapted to provide a visual indication that can be seen at a substantial distance, so that an oncoming motorist can readily perceive the extent of time remaining before he reaches the intersection.

Another object of importance is to so design the device as to provide the visual indication as a peripheral, illuminated portion of the traffic light, with the illumination of said portion being afforded by the same bulb that is used to illuminate the red or green colored lens of the signal.

Another object of importance is to so form the device as to link, for conjoint movement, adjacent indicia of a pair of lights both facing in the same direction, that is, a stop and a go light, said indicia being movable about the peripheries of the particular lamp assemblies responsive to energizing of one or the other of said assemblies.

Another object of importance is to provide a simplified construction wherein the rotatable indicia, shiftable along an alluminated path so as to afford an indication for motorists clearly visible at a substantial distance, are mounted to rotate on the lamp housings themselves, thus to simplify the construction considerably.

Still another object of importance is to provide a device as stated wherein, in at least one form of the invention, the indication is afforded by means of a semicircular band of white light, extending peripherally of a green or red light, with said semicircular band being progressively reduced in length as the duration of time before the next light change grows shorter and shorter, the white light ultimately disappearing simultaneously with the making of the light change.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 5 is an enlarged, vertical sectional view substantially on line 5—5 of Fig. 2.

Fig. 6 is an electrical diagram showing the wiring incorporated in the construction.

Fig. 7 is a fragmentary perspective view showing the support means for the motor.

Fig. 8 is a perspective view of a modified form of ring gear and associated index means.

Figure 1:
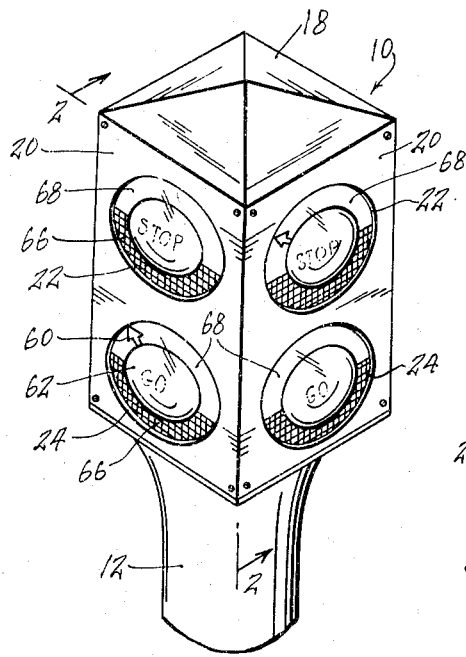
Fig. 1 is a perspective view of a traffic light signal formed according to the present invention, the supporting standard of the signal being shown only fragmentarily.

Referring to the drawings in detail, the numeral 10 generally designates a traffic light signal formed according to the present invention. The signal includes the usual supporting post or standard 12, it being understood that alternatively, the signal can be suspended from an overhead support.

Figure 2:
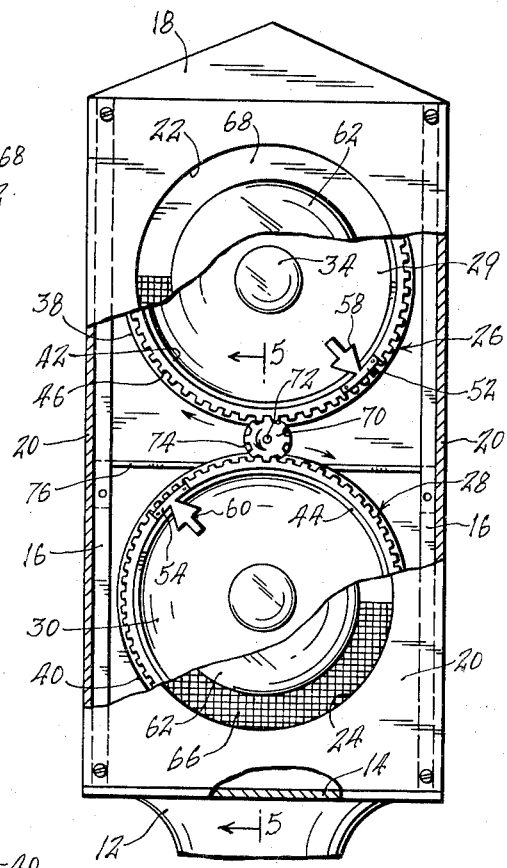
Fig. 2 is an enlarged view substantially on line 2—2 of Fig. 1.

As shown in Figs. 2 and 5, fixedly secured at its center portion to the upper end of the post 12, in any suitable manner, is a flat, rectangular base plate 14 lying in a horizontal plane. Welded at their lower ends to the several corners of the base plate, and extending upwardly from the base plate for a substantial distance, are corner posts 16, said corner posts at their upper ends being welded to the several corners of a pyramidal protective cap 18. The base plate, cap, and corner posts 16 cooperate to define a supporting frame, and connected to the several corner posts to close the frame at the several sides thereof are vertically disposed, rectangular cover plates 20 each of which has a pair of vertically spaced, circular lens openings 22, 24 respectively in back of which are mounted lamp assemblies 26, 28 respectively.

The several plates 20, as shown in Fig. 1, are secured at their respective corners to the opposite ends of the posts 16, and it will be understood that access to the interior of the traffic light signal can be readily had by removing a selected one or more of the cover plates.

Figure 3:
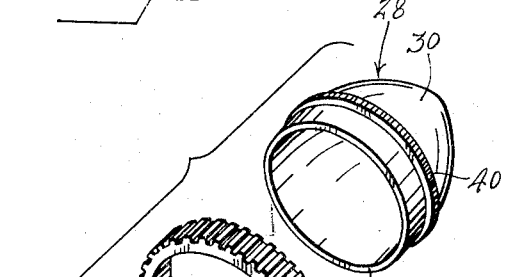
Fig. 3 is an exploded perspective view of one of the lamp assemblies per se.

The several lamp assemblies are all identically formed, each of said assemblies being formed as shown in Fig. 3. Two lamp assemblies are provided for each cover plate 20, in a typical installation, to provide an upper "stop" signal and a lower "go" signal, both facing in the same direction as shown in Fig. 1.

The lamp assemblies 26, 28 respectively include partly spherical lamp housings or reflectors 29, 30, having at their centers openings receiving sockets 32, for clear lamp bulbs 34, 36.

At their larger, open ends, the housings 29, 30 are integrally formed with outwardly directed, circumferential flanges or collars 38, 40, and projecting forwardly from said collars are integral, cylindrical extensions 42, 44 on which are rotatably mounted ring gears 46, 48. The ring gears engage against the flanges 38, 40 at one side thereof, and at their other sides are in wiping contact with the marginal portions of the lamp assembly lenses, which lenses are secured to the cover plates by screws, clips, or equivalent fastening means.

Figure 4:
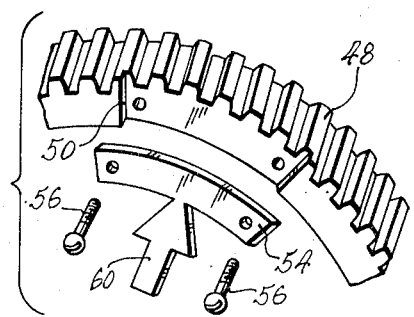
Fig. 4 is an enlarged, fragmentary perspective view showing one of the ring gears and one of the indicia carried by said ring gear.
Figure 9:
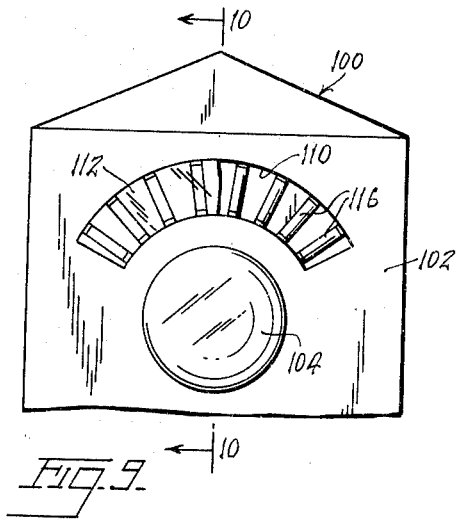
Fig. 9 is a fragmentary front elevational view of a traffic signal showing another modification.
Figure 10:
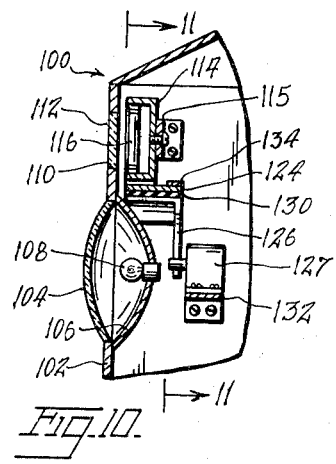
Fig. 10 is a vertical section on line 10—10 of Fig. 9.

The ring gears 46, 48 are each formed with a shallow recess 50 (see Fig. 4), and filling said recesses are arcuate, elongated plates 52, 54 fixedly secured within the recesses to their associated ring gears by screws 56. Integrally formed upon the inner longitudinal edges of the plates 52, 54 are index elements 58, 60, these being in the form of short arrows the apex portions of which are fixedly secured to the associated support plates 52, 54.

The index or indicator elements 58, 60, as shown in Fig. 2, are disposed inwardly of the cylindrical extensions 42, 44 of the lamp housings, thus to be in the path of the rays emanating from the lamps 34, 36.

Each of the lamp assemblies is provided with a lens 61, said lens having a concave-convex main lens portion 62. According to the particular location on the traffic signal, this would be suitably tinted, and thus, the upper lens 62 on each side of the traffic signal, as shown in Fig. 1, would have a red-tinted main lens portion, while the lens just below the same would have a green-tinted main lens portion. Further, the lens portions could be suitably marked with letters indicating the significance of the coloring thereof.

Integrally formed upon the periphery of the main lens portions 62 are planiform, annular flanges 64 engaged against the edge portions of the openings 22, 24 of the associated cover plate. The flanges 64 have the greatest portions of their areas disposed inwardly from the edges of the openings 22, 24, with the indicator elements 58, 60 being disposed immediately in back of the flanges as shown in Fig. 5.

Each flange 64, for 180 degrees of its circumference, is opaque, and in the illustrated example, the opaqueness is imparted to the flanges by coloring the same black. The opaque portions of the flanges have been designated at 66, and the remaining portions 68, also extending through 180 degrees, are translucent, and for example can be of white frosted glass.

In mesh with both ring gears 46, 48 between the same is a drive pinion 70, secured to a shaft 72 of a small electric motor 74 mounted upon a horizontally disposed ledge 76 which, as shown in Fig. 7, has inturned ends secured to their associated corner posts 16. A different motor 74 would be provided for each of the several pairs of lamp assemblies of the traffic signal, and a typical circuit arrangement for each of the motors and its associated pair of lamp assemblies is shown in Fig. 6. As shown, extending from one side of a source of electricity or power circuit is a lead 78, extending to one terminal of a switch 80. The switch 80 has two positions, in one of which it bridges contacts between lead 78 and a lead 82 extending to one side of lamp bulb 34, and in the other of which it bridges contacts between lead 78 and a lead 84 extending to one side of the other lamp bulb 36. In other words, one or the other of the lamp bulbs is always illuminated, in the illustrated embodiment of the invention.

The positions of the switch are controlled by a suitable timing device, not shown, and in the illustrated example, the "stop" and "go" signals are both energized for identical periods of time. However, it will be understood that other arrangements can be effected, according to the needs of the particular situation.

Connected to the other sides of the bulbs 34, 36 are leads 86, 88 both connected to a lead 90 extending to one side of the motor 74, from the other side of which extends a lead 92 back to the source of power.

It will be seen that the motor 74 is connected in series with each of the bulbs 34, 36, and will always be energized, regardless of which bulb is on.

The speed of the motor, as will be understood, is such that each indicator element will travel through 360 degrees of a circle during each full cycle of a particular lamp assembly. In other words, the "stop" lamp, including the bulb 34, has the bulb 34 energized for half its complete cycle and deenergized for the remaining half. At the time the bulb 34 becomes energized, the indicator element 58 is just at the beginning of the translucent, semicircular light band 68 of this particular lamp assembly, that is, at the left-hand end of the translucent band. While the bulb 34 is on, the indicator element 58, which will show up as a black arrow in back of the white, translucent flange portion 68, with said arrow being clearly silhouetted by reason of its being in the path of the light rays emanating from the bulb 34, will begin to travel slowly from the left to the right-hand end of the white, translucent band. As it reaches the right-hand end of said band, the light changes, the lamp 34 being now deenergized while lamp 36 is energized. The green light, when energized, illuminates the white, semicircular band immediately thereabove, and at the same time, the indicator element 60 will be at the left-hand end of the band, and will begin to move slowly along the length of the band, to the right-hand end, reaching said right-hand end as the lamp 36 goes off.

Meanwhile, the indicator element 58 will have been traveling, with lamp 34 deenergized, in back of the opaque flange portion 66 of the "stop" light assembly. In this connection, in some instances it may be satisfactory to eliminate an opaque portion, since the lamp in back of the same is in any event deenergized while the indicator element is passing along the opaque portion. However, the use of an opaque portion insures that there will be no possibility of error on the part of a motorist, since even in bright daylight, the indicator element cannot be seen in back of the opaque portion.

It will be understood that the motors associated with the several lamp assemblies, that face in different directions, will all be so synchronized as to provide for proper disposition of the several indicator elements, as shown in Fig. 1, this being achieved through the use of suitable timing mechanisms, not shown, well known to those working in the art.

In Fig. 8, there is shown a slightly modified form of ring gear 48ᵃ. In this form, instead of a plate 54 having an arrow-type indicator element 60, the indicator element 60ᵃ comprises a semicircular, inwardly directed, flange extending through 180 degrees of the inner circumference of the ring gear 48ᵃ and integrally formed upon the ring gear. The flange 60ᵃ, constituting an indicator element, is opaque, and when this particular type of ring gear is used instead of the ring gear 46 or 48, it will be seen that as a particular light becomes illuminated, the indicator element 60ᵃ will, at this moment, be in full registration with the opaque portion 66. As the ring gear 48ᵃ turns with, for example, lamp bulb 34 energized, it will progressively move along the illuminated, translucent path 68, continuously reducing said path in length until finally, just as the light 34 is about to go out, the opaque indicator element 60ᵃ will have obliterated practically the entire illuminated path 68, said white, illuminated path being ultimately completely obliterated simultaneously with the changing of the light.

In both forms of the invention, there is the desirable characteristic wherein a motorist, approaching the traffic signal, can see the particular situation at a glance, from a substantial distance. Both forms of indicator elements are such as to provide a clear visual indication, so that as the motorist approaches the signal, he can make a proper decision as to whether to slow up the vehicle preparatory to bringing it to a halt, or alternatively, prepare the vehicle for continuing on through the intersection. Further, as to motorists who are already stopped at the intersection, the visual indication can be clearly observed, for the purpose of preparing one's vehicle for movement as the light changes from "red" to "green."

Of course, the actual length of time each indicator element travels through 360 degrees of a circle will depend upon the particular timing of the light signal, and suitable reduction gearing or equivalent means can be employed between the motor shaft and the pinion, to insure that there will be an exact, predetermined relationship between the energizing and deenergizing of the bulbs 34, 36 in timed sequence, and the movement of the indicator elements 58, 60 or 60a about the peripheries of the lamp assemblies.

In the form of the invention shown in Figures 9–12, the traffic signal has been generally designated at 100, and includes a casing 102 having a lens opening in which is mounted a lens 104 behind which is disposed a reflector 106 on which is centrally mounted a lamp bulb 108. In this form of the invention, concentric with and disposed above lens 104 is an arcuate window 100 in which is mounted a translucent, white sheet of glass or plastic material of a type adapted to partially diffuse light passing therethrough.

In back of the window, and curved correspondingly to and coterminous therewith, is a support bracket 114 of C-shaped cross section, secured in proper position by attachment of the bracket to a horizontal support bar 115 carried by the casing.

Carried by the bracket 114, and spaced uniform distances apart along the full length of the bracket, are electric lamps 116 of elongated, cylindrical formation, arranged radially of the lens 104. Preferably, these are fluorescent tubes, but incandescent tubes can be used if desired. The tubes are received at opposite ends in sockets 118, 120 of electrically insulative material, mounted in openings spaced along the top and bottom walls of the bracket.

The lower or inner sockets 120 are provided with electrically conductive contacts 122 adapted to be engaged by an arcuate contact bar 124 curved about a center common to that of the bracket 114, that is, the center of the lens 104. The contact bar 124, of electrically conductive material, is carried by a support arm 126 extending radially from and keyed or otherwise secured for rotation with the shaft of an electric motor 127. Arm 126, at its outer end, has a forwardly projecting extension 128, extending transversely of contact bar 124 below the same, and interposed between extension 128 and the midlength portion of contact bar 124 is a spacer 130 of electrically insulative material. The bar 124 can be cemented or otherwise fixedly secured to the insulative plate 130, and said plate can in turn be cemented to the extension 128.

The motor 127 is mounted in back of the reflector 106, upon a horizontal motor support bar 132 carried by the casing.

The contact bar 124 (see Fig. 12) is substantially wider than the bracket 114, so as to project rearwardly from said bracket, and the projecting portion of the bar 124 is adapted to slidably engage a stationary contact bar 134 arcuately curved about a center common to that of the bar 124 and fixedly secured in place within the casing in a position overlying the bar 124.

Extending from the stationary contact bar 134 is a lead 136, while a lead 138 is electrically connected to the terminals of the outer sockets 118 of the fluororescent tubes.

It will be understood that the motor has a speed reduction means, to slow to the necessary extent the rotation of the shaft-carrying arm 126.

In this form of the invention, the motor 127 is continuously operated, so that contact bar 124 is continuously moving very slowly through a circular path. Suitable carrying means is employed so that at the time the conventional timing device of the electric signal, connected in circuit with lamp 108, causes lamp 108 to be energized, the contact bar 124 will be in the position shown in Fig. 11. The lamp 108 is in circuit, also, with the several tubes 116 and accordingly, when the lamp 108 is to be energized, and with contact bar 124 in the Fig. 11 position, in which position it is in engagement with all the contacts 122 of the lower sockets 120, lamp 108 will be illuminated, as will all the tubes 116, the illumination of lamp 108 and tubes 116 occurring simultaneously.

Figure 11:
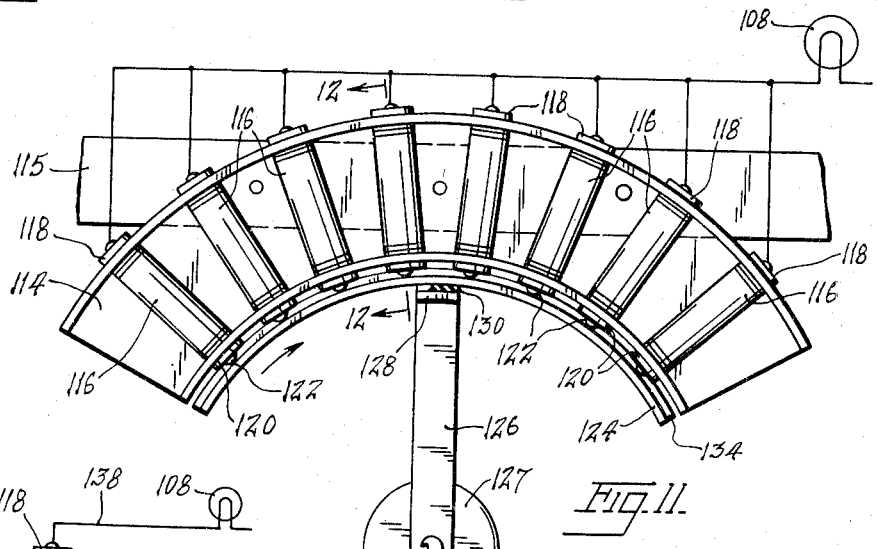
Fig. 11 is an enlarged sectional view on line 11—11 of Fig. 10.
Figure 12:
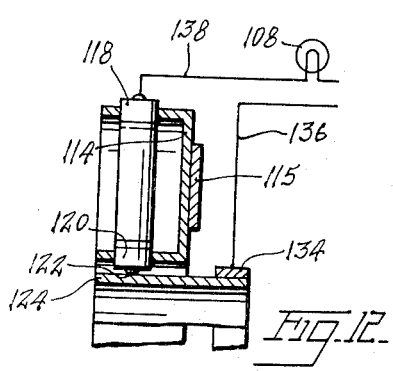
Fig. 12 is a sectional view, still further enlarged, on line 12—12 of Fig. 11.

As previously noted, the bar 124 is continuously moving through a circular path and, accordingly, with lamp 108 remaining energized, after a predetermined interval tube 116 will go dark, due to movement of bar 124 in the direction of the arrow shown in Fig. 11, to an extent sufficient to break contact between the bar 124 and the contact 122 of the end tube 116 shown at the left in Fig. 11. After another predetermined time interval, as for example of a few seconds duration, the tube 116 next to that which went dark will, in turn, go dark, and as the bar 124 breaks contact with successively following contacts 122 of the tubes, said tubes will go dark in succession, from the left to the right hand end of the series of tubes shown in Fig. 11. Finally, the bar 124 will move out of engagement with the contact 122 of that tube 116 shown as being furthest to the right in Fig. 11, and simultaneously with the deenergizing of the last tube 116, the lamp 108 will be deenergized, due to the fact that disengagement of bar 124 from the last contact will break a circuit including the lamp 108.

It will be seen that by reason of this arrangement, whenever a green or a red signal flashes on, the arcuate series of tubes 116 will be simultaneously illuminated therewith, and then, as the time expires during which the signal lamp is to remain illuminated, there will be a timed deenergizing of successively following tubes 116 over the arcuate band of white light above the signal, so that the motorist can visually observe how much time remains before the signal is to go dark.

It is to be understood that this signal device may be provided with the light tubes 116 in a straight line instead of arcuate formation for using this arrangement as a timing device for sporting events and for other suitable purposes where there is a time limit involved.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A traffic light signal comprising a frame, a cover plate thereon, a pair of alternately energizable lamp assemblies mounted on the frame in back of the cover plate, and means traveling circumferentially of each assembly while the same is energized affording a visual indication of the length of time said assembly will remain energized, including ring gears mounted upon the respective assemblies, said signal including a pinion in mesh with both ring gears to rotate the same in a common direction about their associated lamp assemblies, said signal further including a motor having a driving connection to the pinion, said motor being in circuit with both of said lamp assemblies, said means further including indicator members secured fixedly to the ring gears to rotate therewith, said indicator members being in the path of beams emanating from the lamp assemblies, each of said lamp assemblies including a disc-shaped lens having a colored center portion and an arcuate flat, marginal portion translucent for at least part of its circumference, said indicator members traveling in back of said translucent portions, each lens further including an arcuate opaque marginal portion, said indicator members traveling from end to end of the opaque marginal portions of the lenses during the period the associated lamp assemblies are deenergized.

2. A traffic light signal comprising a frame, a cover plate thereon, a pair of alternately energizable lamp assemblies mounted on the frame in back of the cover plate, and means traveling circumferentially of each assembly while the same is energized affording a visual indication of the length of time said assembly will remain energized, including ring gears mounted upon the respective assemblies, said signal including a pinion in mesh with both ring gears to rotate the same in a common direction about their associated lamp assemblies, said signal further including a motor having a driving connection to the pinion, said motor being in circuit with both of said lamp assemblies, said means further including indicator members secured fixedly to the ring gears to rotate therewith, said indicator members being in the path of beams emanating from the lamp assemblies, each of said lamp assemblies including a disc-shaped lens having a colored center portion and an arcuate flat, marginal portion translucent for at least part of its circumference, said indicator members traveling in back of said translucent portions, each lens further including an arcuate opaque marginal portion, said indicator members traveling from end to end of the opaque marginal portions of the lenses during the period the associated lamp assemblies are deenergized, each lamp assembly including a dome-like reflector having a circumferential collar, the ring gear of each lamp assembly being rotatably mounted on said reflector in engagement along one side thereof with said collar, the ring gears at their other sides being in engagement with the marginal portions of the lenses.

3. A traffic light signal comprising a frame, a cover plate thereon, a pair of alternately energizable lamp assemblies mounted on the frame in back of the cover plate, and means traveling circumferentially of each assembly while the same is energized affording a visual indication of the length of time said assembly will remain energized, including ring gears mounted upon the respective assemblies, said signal including a pinion in mesh with both ring gears to rotate the same in a common direction about their associated lamp assemblies, said signal further including a motor having a driving connection to the pinion, said motor being in circuit with both of said lamp assemblies, said means further including indicator members secured fixedly to the ring gears to rotate therewith, said indicator members being in the path of beams emanating from the lamp assemblies, each of said lamp assemblies including a lens having a colored center portion and a flat, marginal portion translucent for at least part of its circumference, said indicator members traveling in back of said translucent portions, each lens further including an opaque marginal portion, said indicator members traveling from end to end of the opaque marginal portions of the lenses during the period the associated lamp assemblies are deenergized, each lamp assembly including a dome-like reflector having a circumferential collar, the ring gear of each lamp assembly being rotatably mounted on said reflector in engagement along one side thereof with said collar, the ring gears at their other sides being in engagement with the marginal portions of the lenses, said indicator members being formed as arrow shaped elements secured fixedly to and projecting radially, inwardly of the associated ring gears with the apex portions of each arrow shaped element being directed radially, outwardly of the associated lamp assembly.

References Cited in the file of this patent

UNITED STATES PATENTS

| | | |
|---|---|---|
| 1,272,396 | Dixon et al. | July 16, 1918 |
| 1,849,393 | Wilcox | Mar. 15, 1932 |
| 2,244,446 | Hammer | June 10, 1941 |
| 2,261,499 | Ledward | Nov. 4, 1941 |